March 1, 1949. P. J. RUDOLPH 2,463,430
SEISMIC SURVEYING
Filed Jan. 9, 1945
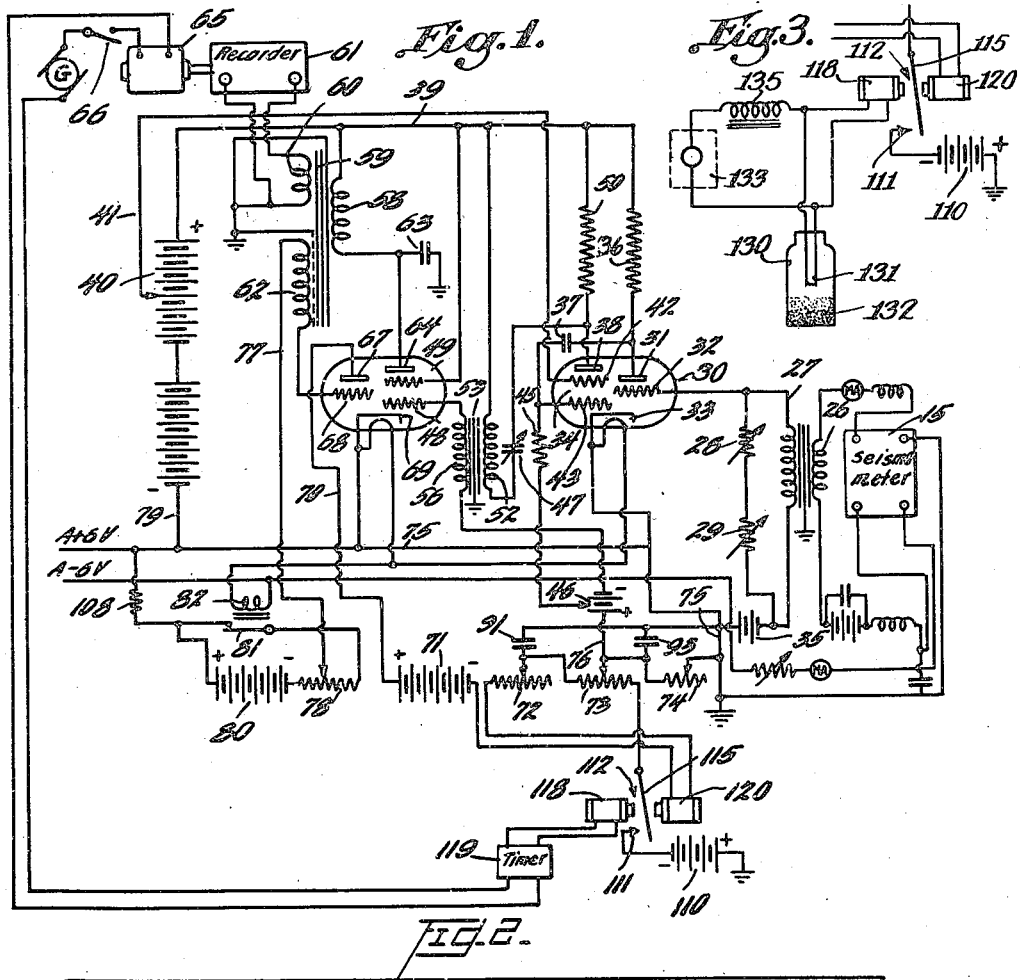
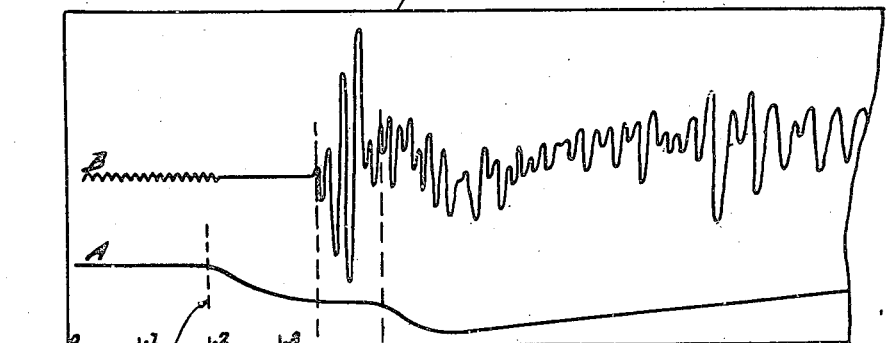
Initiation of Gain Reduction   First Arrival   A/C operation
Inventor
Paul Jackson Rudolph
By Watson, Cole, Grindle & Watson
Attorneys Patented Mar. 1, 1949

2,463,430

UNITED STATES PATENT OFFICE 2,463,430

SEISMIC SURVEYING

Paul J. Rudolph, San Antonio, Tex., assignor to Olive S. Petty, San Antonio, Tex.

Application January 9, 1945, Serial No. 572,072

7 Claims. (Cl. 177—352)

This invention relates to methods of and apparatus for conducting seismic surveys, and more particularly to the amplification and recording of seismic wave trains which have been generated by firing a charge of explosive at a remote point. Thus, a common method of geophysical exploration involves the steps of detonating an explosive charge on or at a suitable distance below the surface of the earth, detecting the resulting seismic impulses at a plurality of spaced points remote from the point of detonation, converting the seismic impulses arriving at each such point into electrical wave form energy, amplifying the energy, and finally recording the energy, for instance by means of a recording oscillograph.

The amplitude of these seismic impulses varies widely; in order that the record of the impulses of large amplitude may be confined within the limits of the sensitized strip on which the amplified energy is customarily recorded, and in order that the record of the impulses of small amplitude will be of sufficient size to permit ready interpretation, it is common practice to employ amplifying equipment in which the gain is variable and is automatically controlled in response to variation in amplitude of the seismic energy being received.

It is of importance in the interpretation of these records or seismograms to ascertain the precise time of arrival of the first seismic impulse, which is usually of rather low amplitude, but I have found that if the amplifier is so adjusted as to afford maximum gain at the time of arrival of this first impulse, extraneous noises (disturbances not resulting from detonation of the charge) are amplified and reproduced on the record to such an extent that the time of arrival of the first wave is somewhat obscured. It is therefore preferable to so adjust the amplifier that at the time of the first arrival, the moving element of the oscillograph shall be quiet and essentially free from movement. However, the gain at the time of first arrival should be substantially greater than that commonly established for recording the high amplitude waves which usually closely follow the first arrival.

I have also discovered that there is considerable advantage in recording the extraneous noise at the beginning of the record, and at a high gain level. This makes it possible to interpret the latter portion of the record, when the seismic impulses are usually of low amplitude and the gain high, in the light of the effect produced by extraneous noise, in order that the true nature of these seismic impulses of small amplitude may be more easily perceived and better understood.

It is accordingly an object of the instant invention to provide a method of amplifying and recording seismic wave trains so as to establish at the beginning of the record high amplification and recording of extraneous noises, thereafter, and before the first arrival of seismic impulses, to reduce the amplification to a level sufficiently lower to eliminate substantially the effect of extraneous noise, whereby the first arrival may be recorded with clarity, then to further reduce the amplification to permit recording within reasonable limits of the early impulses of extremely high amplitude. Preferably the gain is then regulated, as is common in amplifiers equipped with automatic gain control, to provide gradually increased gain toward the end of the record to compensate for attenuation of the later arriving impulses.

Further objects and features of the invention will be apparent from the following description taken in connection with the accompanying drawings in which Figure 1 is a circuit diagram of an amplifier and recorder for wave form electrical signals to which the invention has been applied;

Figure 2 is a record strip or seismograph on which is recorded a curve representative of received and amplified energy and a curve representing variation in amplification or gain within the purview of the present invention.

Figure 3 is a representation of a portion of the circuit shown in Figure 1, illustrating a modified form of the invention.

In order to facilitate an understanding of the invention, reference will be made to the embodiment thereof illustrated in the accompanying drawings and specific language will be employed. It will nevertheless be understood that various further modifications of the apparatus illustrated herein, such as would fall within the province of those skilled in the art to construct, are contemplated as part of the present invention.

Referring now to the drawings for a better understanding of an actual embodiment of the invention, there is shown in Figure 1 a detector or seismometer 15 of any suitable type adapted to convert seismic energy to wave form electrical signals. These signals are fed into a suitable output circuit which includes the primary 26 of a transformer, the secondary 27 of which is shunted by a pair of variable resistors 28 and 29, one for coarse and one for fine adjustment, for manually setting the level of the signal applied to the amplifier.

The secondary 27 feeds into the cathode and grid of the thermionic valve 30 which constitutes a simple triode amplifier having the anode 31, grid 32, and heated cathode 33 which it shares in common with the elements of the second stage amplifier valve indicated at 34. A suitable biasing battery 35 is arranged in the grid circuit of the triode amplifier. This amplifier is coupled to the second stage amplifier by means of an anode coupling resistor 36 and condenser 37. The anode 31 as well as the anode 38 of the second stage valve receive their voltage supply through the common conductor 39 connected to the positive end of the battery 40. A tap 41 in this battery supplies the screen grid 42 of the second stage amplifier with a somewhat lower potential, permitting more gain and improved automatic volume control. The control grid 43 of the second stage amplifier is coupled by the condenser 37 to the anode of the first stage and receives its bias through resistor 45 from a tap on battery 46. An adjustable coupling condenser 47 and anode resistor 50 provide the coupling between the second stage anode 38 and the control grid 48 of the third stage amplifier valve 49. Condenser 47 acts in the nature of a filter, first to avoid flow of anode current through the primary winding 52 of the interstage coupling transformer 53, thus increasing the transformer life and permitting its design to be more efficient, and second, to vary the frequency response of the amplifier, giving it the highest gain on the desired frequencies and very low gain on undesired frequencies, which effect comes from resonating the transformer primary.

The second winding 56 of the interstage transformer 53 connects between the control grid 48 and the bias battery 46. The output from the third stage is fed through the primary 58 of transformer 59, one secondary 60 of which delivers the amplified waves to a moving element of a galvanometer associated with and forming part of a recorder 61. Another secondary 62 takes off a portion of the output of the amplifier for supply to the automatic volume control valve as will be further described hereinafter. The condenser 63 between the anode 64 of the third stage valve and ground serves to by-pass high frequencies and to resonate the output transformer to assist in the desired filter action. At the same time, this condenser performs the important function of assisting in the damping of the moving element of the galvanometer.

In the same envelope with valve 49 is a triode, which may for convenience be referred to as the A. V. C. valve, comprising anode 67, grid 68, and the common heated cathode 69 which functions also with the elements of the third stage amplifier. The anode 67 is connected by wire 70 to a separate source 71 of anode voltage, the negative pole of which leads through variable resistors 72, 73, and 74 back to wire 75 connected to the positive end of the source of heater current and common ground terminal. It will be noted that bias battery 46 is connected by wire 76 to the slider of the resistor 73 and hence is also connected to the ground through resistor 74 which is arranged in shunt with condenser 93. The battery 71 may have a potential of about 45 volts for the type of valve shown, while the value of resistors 72, 73, and 74 may be of the order of 200,000 ohms each. A condenser 91 is connected across resistors 73 and 74 to ground.

The grid 68 of the A. V. C. valve is fed from the secondary 62 of the output transformer 59, the opposite end of which is connected by conductor 77 to the slider of a potentiometer 78 energized from battery 80, through the contacts 81 of a relay, the winding 82 of which is in series with the heaters of valves 30 and 49, the positive terminal of battery 80 being returned to the cathode of the A. V. C. valve through resistor 108.

The slider on the potentiometer 78 is set to supply a sufficiently negative bias to the control grid 68 of the A. V. C. valve to normally prevent the flow of any anode current in that valve. Preferably the valve is thus biased substantially beyond cut-off, and flow of anode current occurs only during positive swings of the output signal of sufficient magnitude to drive the grid across the cut-off point toward the positive side. Thus whenever the positive potential supplied from the transformer winding 62 becomes sufficiently high, the grid will permit the flow of current to anode 67.

It will be seen that when no current is flowing in the anode circuit of the A. V. C. valve, the positive pole of battery 46 is substantially at ground potential. The bias on grids 43 and 48 of the second and third stage amplifier valves is therefore determined by the potential of the battery 46 and the gain of the amplifier is fixed thereby. However, when current flows in the anode circuit of the A. V. C. valve through the resistors 72, 73 and 74, the potential of the conductor 76 becomes negative with respect to ground by an amount corresponding to the voltage drop across the resistor 74, and the bias on the grids 43 and 48 is thereby rendered more negative to reduce the gain of the amplifier.

Condensers 91 and 93 are of relatively large capacity, for example of the order of one microfarad, and in conjunction with resistances 72 and 73, constitute a time delay circuit preventing immediate reduction of sensitivity in the amplifier on the arrival of the single impulse of large amplitude, the negative bias on the amplifier valves gradually increasing during the arrival of several successive impulses of high amplitude while the condensers 91 and 93 are being charged, so that noticeable distortion is avoided. Again, these condensers hold the charge thereby imparted to them for a considerable period of time, the rate of discharge being determined by the setting of the resistors 73 and 74.

Thus on the arrival of the earlier waves of excessively large amplitude, the grid 68 of the A. V. C. valve is driven sufficiently positive by the signal energy derived from the output transformer secondary 62 to cause a flow of current to the anode 67, thereby charging the condensers 91 and 93 and applying a more negative bias to the grids 43 and 48 of the amplifier valves to reduce the gain of the amplifier. The setting of the resistor 78 determining the bias on the A. V. C. valve should be such that each of the swings of the signals derived from these excessively large waves causes the A. V. C. valve to function and therefore the charging of condensers 91 and 93 continues until such waves have passed. The first of the reflected waves may be normally too small to cause functioning of the A. V. C. valve but the gain of the amplifier does not immediately return to normal since the charge on condensers 91 and 93 leaks off slowly and hence the bias on the amplifier grids 43 and 48 becomes more positive gradually. The time required for this charge to leak off can be set by appropriate adjustment of resistor 74 to extend substantially for the time during which it is desired to record the reflected waves, or preferably for a lesser time in order to ensure adequate amplification throughout the record, the gain slowly increasing as the strength of the waves is reduced because of the lowering voltage on 91, producing a chart of reasonably uniform character. In the event of arrival during this period of waves sufficiently large to again render the A. V. C. valve operative, the charging of condensers 91 and 93 is repeated.

Suitable mechanism is employed for driving the sensitized strip or the like at the required speed as is customary in seismic recorders. The driving means is represented diagrammatically by a motor 65, the recording being initiated by closing a switch 66 in the energizing circuit of the motor. The closing of the switch may perform a further function, hereinafter described.

As hereinbefore indicated, it is customary to employ a plurality of seismometers disposed at spaced points, each seismometer delivering electrical energy corresponding to the received seismic impulses to a separate amplifier, the output of each amplifier being fed to one of the moving elements of a multiple oscillograph, for instance a multi-string galvanometer. The movements of the several elements of the oscillograph are then recorded on a moving sensitized strip or the like.

It will be understood that in a multiple system employing a plurality of seismometers and associated amplifying units with a multiple oscillograph, the grid bias varying means illustrated herein need not be duplicated in each amplifier since the charge applied to condensers 91 and 93 of one amplifier unit may be used to vary the grid bias of the amplifier valves in the other amplifying units of the series, with resulting simplification in the circuits of such units.

Means suitable for controlling the gain in a manner hereinbefore described to provide for recording extraneous noise at the beginning of the record, and at the same time to provide for adequate recording of the first arrival and of the subsequent high amplitude impulses, will now be described.

A voltage source 110 is grounded at the positive terminal, the negative terminal being connected with the fixed contact 111 of a relay indicated generally at 112. The movable contact 115 of the relay is connected to one end of the resistor 73. The movable element 115 is displaced into contact with the fixed element 111 by a winding or solenoid 118, the latter being energized by suitable timing mechanism, adjusted to actuate the relay after the initiation of the record and before the arrival of the first seismic impulses. Thus, as shown in the drawing, operation of timer 119 may be initiated by the closing of the switch 66, the energizing circuit for recorder motor 65 thus serving to energize the timer. The timer, consisting of a clock mechanism, a time delayed relay, or the like, should be adjusted to energize the winding 118 following a predetermined interval, for instance 0.2 or 0.3 second, after the beginning of the record.

The movable contact 115 may be moved away from the fixed contact 111 by means of a winding or solenoid 120, the latter being energized by current flowing from the anode 67 of the A. V. C. valve, the terminals of the winding being connected respectively to the resistor 72 and to the negative terminal of the battery 71.

At the start of the record, the relay 112 is open, and if the noise level is relatively low so that the A. V. C. is not caused to function, the amplifier will be adjusted for maximum gain and extraneous noise will be recorded. After a predetermined interval following the initiation of recording, the winding 118 will be energized by timer 119 to effect engagement of contacts 115 and 111 of relay 112. This will permit current from the voltage source 110 to flow through a portion of resistors 73 and 74 to the ground. The voltage drop across the portion of resistor 74 through which this current flows is thus applied to condenser 93 and a negative potential supplied through battery 46 to grids 43 and 48, to bias these grids in the negative direction, thereby reducing the gain of the amplifier valves of the second and third stages of the amplifier. The voltage source and the resistors through which the current flows are so adjusted that at this point the gain is reduced sufficiently to substantially eliminate recording of extraneous noise while providing adequate amplification of the relatively weak first arrival. As soon thereafter as the amplitude of the seismic impulses becomes sufficiently high to permit the functioning of the A. V. C. valve, the winding 120 is energized and the relay 112 is opened. The charge placed on condenser 93 by voltage source 110 leaks off through resistor 74, and further control of amplification is effected solely by the A. V. C. circuit.

It will thus be observed that I have provided means operating automatically to establish initial high gain, substantially reduced gain before the time of the first arrival, and further reduction in gain at the time of arrival of high amplitude signals. The resulting record will therefore show the amount of noise, but the record will be substantially free from the effect of noise at the instant of the first arrival. Results similar to those illustrated in Figure 2 are thus achieved, curve A indicating generally the gain of the amplifier during the first portion of the record trace B.

It will be understood that the voltage control provided by the apparatus just described may be effected by other means and may be made receptive to other changes in conditions or characteristics of the received energy. For instance, it may be convenient under some conditions to initiate the first reduction of gain in response to the cap break. One such arrangement is illustrated in Figure 3 of the drawing, with reference to structure shown in the patent to Josephus O. Parr, Jr., No. 2,331,623, granted October 12, 1943.

Thus at 130 is represented a conventional blasting cap having a bridge wire 131 which is adapted to be heated to ignite the fulminating material 132 in the cap which serves to set off the main explosive (not shown). This cap is connected by conductors across the output of the blasting machine 133 which comprises a direct current generator usually arranged for manual operation by means of a plunger. A current limiting means, such as the inductance 135, may be employed to prevent rapid current build-up and to insure relatively slow heating of the bridge wire 131 so that the charge always fires before the wire is burned out electrically. When the bridge wire 11 breaks, the load is removed from the blasting generator and the voltage developed thereby suddenly increases. This effect is augmented by the practical cessation of current flow, so that the inductance 15 no longer exerts its choking action. This sudden increase in voltage is applied to the terminals of winding 118, and the winding is thereby energized sufficiently to operate relay 112, for the purposes hereinbefore pointed out.

Various further methods of effecting reduction in gain of the amplifier so as to substantially eliminate recording of noise at the time of the first arrival, following effective noise recording at the beginning of the record, will readily occur to those skilled in the art to which the invention relates.

Having this described the invention, what is claimed as new and desired to be secured by Letters Patent is:

1. A method of seismic surveying which includes the steps of amplifying and recording extraneous noise at a high level prior to the arrival of wanted seismic signals, thereafter reducing the amplification to a lower level to substantially eliminate the recording of extraneous noise prior to the arrival of the first seismic impulse, and further reducing the amplification after such first arrival to maintain the record of the early high energy impulses within reasonable limits.

2. In apparatus for use in seismic surveying, the combination with a seismometer for converting seismic impulses into electrical wave form energy, an amplifier for said electrical energy, and a recorder for producing a record of the amplified energy, of means associated with said amplifier for varying the gain thereof, and devices controlling said means to establish high gain during an early portion of the record and prior to the arrival of seismic impulses, for effecting a record of extraneous noise, and to maintain a lower gain during the arrival of the first seismic impulse, and to effect further reduction in gain on arrival of early high amplitude waves.

3. In apparatus for use in seismic surveying, the combination with a seismometer for converting seismic impulses into electrical wave form energy, an amplifier for said electrical energy, and a recorder for producing a record of the amplified energy, of means associated with said amplifier for varying the gain thereof, said amplifier having automatic gain control operable to reduce the gain in response to arrival of seismic energy of amplitude exceeding a predetermined amplitude, and devices controlling said means to establish high gain during an early portion of the record and prior to the arrival of seismic impulses, for effecting a record of extraneous noise, and to maintain a lower gain during the arrival of the first seismic impulse.

4. Apparatus for use in seismic surveying including, in combination, an electronic valve amplifier for seismic impulses, said amplifier having automatic gain control for reducing gain in response to signal energy having an amplitude exceeding a predetermined amplitude, of means associated with said amplifier for controlling the gain thereof prior to the arrival of such high amplitude energy, said means including devices establishing initial high gain to amplify extraneous noise to a recordable level, for establishing a less gain during the arrival of the first seismic impulse, and thereafter to render said means inoperative to control the gain.

5. Apparatus for use in seismic surveying including, in combination, an electronic valve amplifier for seismic impulses, said amplifier having automatic gain control for reducing gain in response to signal energy having an amplitude exceeding a predetermined amplitude, of means associated with said amplifier for controlling the gain thereof prior to the arrival of such high amplitude energy, said means including devices establishing initial high gain to amplify extraneous noise to a recordable level, for establishing a less gain during the arrival of the first seismic impulse, and thereafter to render said means inoperative to control the gain, said devices including a source of grid bias voltage, means responsive to the cap break for applying to a grid of an amplifier valve a more negative charge derived from said source, and means responsive to the actuation of the automatic gain control for rendering said source inoperative.

6. Apparatus for use in seismic surveying including, in combination, an electronic valve amplifier for seismic impulses, said amplifier having automatic gain control for reducing gain in response to signal energy having an amplitude exceeding a predetermined amplitude, of means associated with said amplifier for controlling the gain thereof prior to the arrival of such high amplitude energy, said means including a source of voltage, and devices automatically operable to apply a negative charge derived from said source to a grid of an amplifier valve after the beginning of a record of the amplifier output and before the arrival of the first seismic impulse, and to withdraw such charge during the continuance of such record and during the arrival of significant seismic impulses.

7. Apparatus for use in seismic surveying including, in combination, an electronic valve amplifier for seismic impulses, said amplifier having automatic gain control for reducing gain in response to signal energy having an amplitude exceeding a predetermined amplitude, and a recorder for the amplifier output, of means associated with said amplifier for controlling the gain thereof prior to the arrival of such high amplitude energy, said means including a time controlled device effecting reduction of gain after the beginning of the record and before the arrival of the first seismic impulse, whereby extraneous noise is first recorded at a high level of gain and is substantially eliminated from the record during the first arrival.

PAUL J. RUDOLPH.

REFERENCES CITED

The following references are of record in the file of this patent:

UNITED STATES PATENTS

| Number | Name | Date |
| --- | --- | --- |
| 2,312,934 | Shook | Mar. 2, 1943 |
| 2,318,795 | Peters | May 11, 1943 |
| 2,319,626 | Paslay | May 18, 1943 |
| 2,354,420 | Minton | July 25, 1944 |
| 2,374,204 | Hoover | Apr. 24, 1945 |
| 2,395,481 | Hoover | Feb. 26, 1946 |